US011186074B2

(12) United States Patent
Gussert et al.

(10) Patent No.: US 11,186,074 B2
(45) Date of Patent: Nov. 30, 2021

(54) METHOD AND APPARATUS FOR CHANGING ROLLS ON AN EMBOSSER/LAMINATOR MACHINE

(71) Applicant: Paper Converting Machine Company, Green Bay, WI (US)

(72) Inventors: Cory P. Gussert, Pulaski, WI (US); Tyler D. Bushelle, Suamico, WI (US); Stefano Spinelli, Green Bay, WI (US)

(73) Assignee: PAPER CONVERTING MACHINE COMPANY, Green Bay, WI (US)

( * ) Notice: Subject to any disclaimer, the term of this patent is extended or adjusted under 35 U.S.C. 154(b) by 0 days.

(21) Appl. No.: 16/868,710

(22) Filed: May 7, 2020

(65) Prior Publication Data

US 2020/0262189 A1 Aug. 20, 2020

Related U.S. Application Data

(62) Division of application No. 15/848,595, filed on Dec. 20, 2017, now Pat. No. 10,730,274.

(Continued)

(51) Int. Cl.
*B31F 1/07* (2006.01)
*B32B 37/00* (2006.01)
(Continued)

(52) U.S. Cl.
CPC ............ *B32B 37/0053* (2013.01); *B31F 1/07* (2013.01); *B31F 2201/0753* (2013.01);
(Continued)

(58) Field of Classification Search
USPC ............................................ 156/60; 162/362
See application file for complete search history.

(56) References Cited

U.S. PATENT DOCUMENTS 10,220,591 B2 * 3/2019 Montagnani .............. B31F 1/07

FOREIGN PATENT DOCUMENTS

| EP | 1775115 A1 | 4/2007 |
| EP | 1836045 A1 | 9/2007 |

(Continued)

OTHER PUBLICATIONS

International Search Report and Written Opinion for PCT/US2017/067625 dated Jun. 4, 2018.

*Primary Examiner* — Mark Halpern
(74) *Attorney, Agent, or Firm* — Thompson Coburn LLP

(57) ABSTRACT

An embosser/laminator machine has an adhesive unit releasably connectable with a main frame structure of the machine, and a roll extractor configured to move a roll between the main frame structure and an exchange position between the main frame structure and the adhesive unit when the adhesive unit is spaced from the main frame structure during removal and installation of the roll. The sub-frame comprising the adhesive unit may be formed with a bearing cap that cooperates with the main frame structure such that when the adhesive unit is connected with the main frame structure, the roll is operatively secured to the machine between main frame structure and the sub-frame of the adhesive unit for normal operation of the machine. When the sub-frame comprising the adhesive unit is released and spaced from main frame structure, the roll may be removed from and installed into the main frame structure.

19 Claims, 19 Drawing Sheets

Related U.S. Application Data

(60) Provisional application No. 62/438,715, filed on Dec. 23, 2016.

(51) Int. Cl.
  *B32B 37/12* (2006.01)
  *B32B 38/06* (2006.01)

(52) U.S. Cl.
  CPC ............ *B31F 2201/0776* (2013.01); *B31F 2201/0782* (2013.01); *B31F 2201/0787* (2013.01); *B32B 37/12* (2013.01); *B32B 38/06* (2013.01); *B32B 2317/18* (2013.01)

(56) References Cited

FOREIGN PATENT DOCUMENTS

| | | | | |
|---|---|---|---|---|
| WO | 2005/123374 A1 | 12/2005 | | |
| WO | 2006/027809 A1 | 3/2006 | | |
| WO | 2015/150452 A1 | 10/2015 | | |
| WO | WO 2015/150452 | * 10/2015 | ............... | B31F 1/07 |
| WO | 2016/087050 A1 | 6/2016 | | |

* cited by examiner

METHOD AND APPARATUS FOR CHANGING ROLLS ON AN EMBOSSER/LAMINATOR MACHINE

CROSS-REFERENCE TO RELATED APPLICATION

This application is a divisional application of Ser. No. 15/848,595, filed Dec. 20, 2017, which claims the benefit of provisional application of U.S. Ser. No. 62/438,715, filed Dec. 23, 2016, the disclosures of which are incorporated by reference herein.

BACKGROUND

In the production of cellulose ply products, such as toilet rolls, kitchen rolls, paper handkerchiefs, napkins, and similar items, it is frequent to process a ply of web material by means of embossing, passing the ply through an embossing nip station formed by a pair of steel rolls or by a pair comprised of a steel roll made of steel or other relatively stiff material, and a pressure roll coated with an elastic material such as rubber. The steel roll has protuberances that deform the elastic coating of the pressure roll. The pressure exerted between the embossing roll and the pressure roll causes permanent deformation of the cellulose material ply, which passes through the embossing nip formed between the embossing roll and the pressure roll. Two or more plies, at least one, some or all of which are embossed, are then brought together to form a multi-ply web material. The web material may be wound to form rolls, or it can be cut and folded to form handkerchiefs, napkins, or similar. Each ply may in turn consist of one or more layers of cellulose material.

The embossing pattern is for decorative and functional purposes. From a functional point of view, embossing serves to create limited areas to which glue is applied to bond multiple plies that form the web material to one another. Embossing is also used to increase the overall thickness of the web material, increase its softness and absorption capabilities, and for other functions known in the field.

An embossing-laminating device is generally defined as a device that performs an embossing process on at least one ply and bonds two or more plies together by lamination, possibly using glue applied to at least one of said plies, preferably on the protruding surfaces of at least some of the embossing protuberances formed on one or more plies.

To meet the needs of modern tissue paper converting lines, the embossing rolls of the embossing/laminating device need to be changed, both in order to aesthetically change the pattern of the web material, and in order to change its functional characteristics; for example, to switch from the production of toilet paper to the production of kitchen paper and vice-versa. Indeed, since embossing in certain cases has functional uses that are not simply aesthetic, embossing patterns used to produce toilet paper are not always suitable for the production of kitchen paper, and vice-versa. The consistency, thickness, weight and content of cellulose plies for the production of various types of finished articles may also differ, requiring embossing patterns which differ from one type of product to another.

Embossing/laminating machines have been designed that have particular features aimed at simplifying and speeding up the embossing roll change-over process.

EP1074382 discloses an embossing-laminating device wherein a set of three embossing rolls is mounted on a star rotating unit, which makes it possible to select one or other of the three embossing rolls to make it co-act with the pressure roll, so as to modify the embossing pattern. Depending on the type of pattern required, one or other of the three rolls is brought to the operating position by rotating the star unit. In some embodiments disclosed in EP 1074382, the star rotating unit supports three pairs of embossing rolls which can be selectively brought to the operating position, to co-act with two pressure rolls, by rotating the star unit.

This known device is particularly complex and requires a heavy support structure for the embossing rolls, which all remain supported by the same star unit that supports the pair of embossing rolls actually used. Furthermore, this known device enables only one roll for the upper ply to be replaced, while the one for the opposing ply cannot be replaced automatically. In some cases, it is useful to modify only the embossing pattern of one ply, while keeping the embossing pattern of the opposing ply fixed. This is particularly true, for example, in the production of double-sided materials where one of the outer plies is micro-embossed, with a pattern that remains always the same, while the other outer ply is embossed with a decorative motif, which can vary according to the processing order. But in some other cases it is necessary to change both rolls, like in the case of switching from a towel roll product to a toilet roll product, or in the case of switching rolls between similar converting lines. With the device described in EP1074382, it is therefore necessary to have more rolls, which increases the overall costs, or is necessary to use conventional manual devices, like a crane, to remove all the rolls from the machine, resulting in longer roll change time.

EP1836045 discloses an embossing-laminating device with interchangeable embossing rolls that is improved with respect to the device disclosed in EP1074382. In fact, the device disclosed in EP1836045 makes it possible to have a plurality of pairs of embossing rolls in a magazine and to select one or other of said pairs, inserting them in the embossing-laminating device. This means that it is no longer necessary, as is the case with EP1074382, to have all the embossing rolls fitted with the machine supported by the same star unit. This makes it possible to simplify and lighten the embossing device while at the same time having available a large number of pairs of alternative rolls, in much larger quantities than those permitted by EP1074382.

U.S. Pat. No. 7,584,698B2 describes a method of mounting and accessing rolls that improves access to the roll, but in a less ergonomic and automated way than is described herein. While removal with a crane is eased, access to the roll for personnel performing the change is not, making for an inefficient roll change.

US20030075263A1 discloses a corrugator device capable of a quick changeover between two corrugating rolls so that one roll or the other can be positioned in working position while the other remains into the machine. The limitation in this case is the fact that if one of the rolls inside the machine has to be changed for maintenance or product change, the change time is increased.

WO2015/150452A1 describes a laminator with an automated change process that places the steel embossing rolls in a magazine mounted beneath the laminator where they are stored while not in use. There are numerous issues with this approach including inability to clean and maintain the rolls, a limited number of rolls that can be automatically changed, and the inability to share rolls between other embosser/laminators within the same manufacturing facility.

U.S. Pat. No. 9,193,127B2 describes a roll changing device that operates on a pair of rolls and manages the selection of the rolls within the main machine. This method has a drawback in that the number of interchangeable rolls dictates the size of the machine. A small machine footprint is critical to many operators of this equipment so an additional space requirement is seen as negative. A further drawback is that more complex equipment is required to be onboard the main machine to change the roll sets than described herein, affecting access for operability and maintainability of the machine.

To ease roll change many embosser/laminators use a belt driven main transmission in a way that the steel embossing roll is not captured by the belt. Many also couple multiple embossing rolls together with a belted transmission. This allows for easier access to the roll for changing but it has technical drawbacks. Belt transmissions are inherently more compliant than geared transmissions. More transmission compliance means that the load is not driven accurately which can lead to misalignment when doing certain multiple-ply operations where many embossing rolls are rotated synchronously, known by experts in the field as "nested" or "DESL". By coupling the drive motor directly to the load, more accurate feedback is achieved and if errors arise they can be corrected quickly by the machine's control system.

All of these known systems are designed to speed the roll changing process and in many cases increase the level of safety in doing so. They all require the additional expense of built-in equipment to manage the roll change process. This additional expense limits its availability to the market. Only those operators whose budget allows for this extra expense can benefit from the improvements of these known devices. The rest of the market is left with changing rolls using cranes that may have difficult access points and lifting requirements. These drawbacks of the prior art are addressed in the description that follows below.

DETAILED DESCRIPTION

Figure 1:
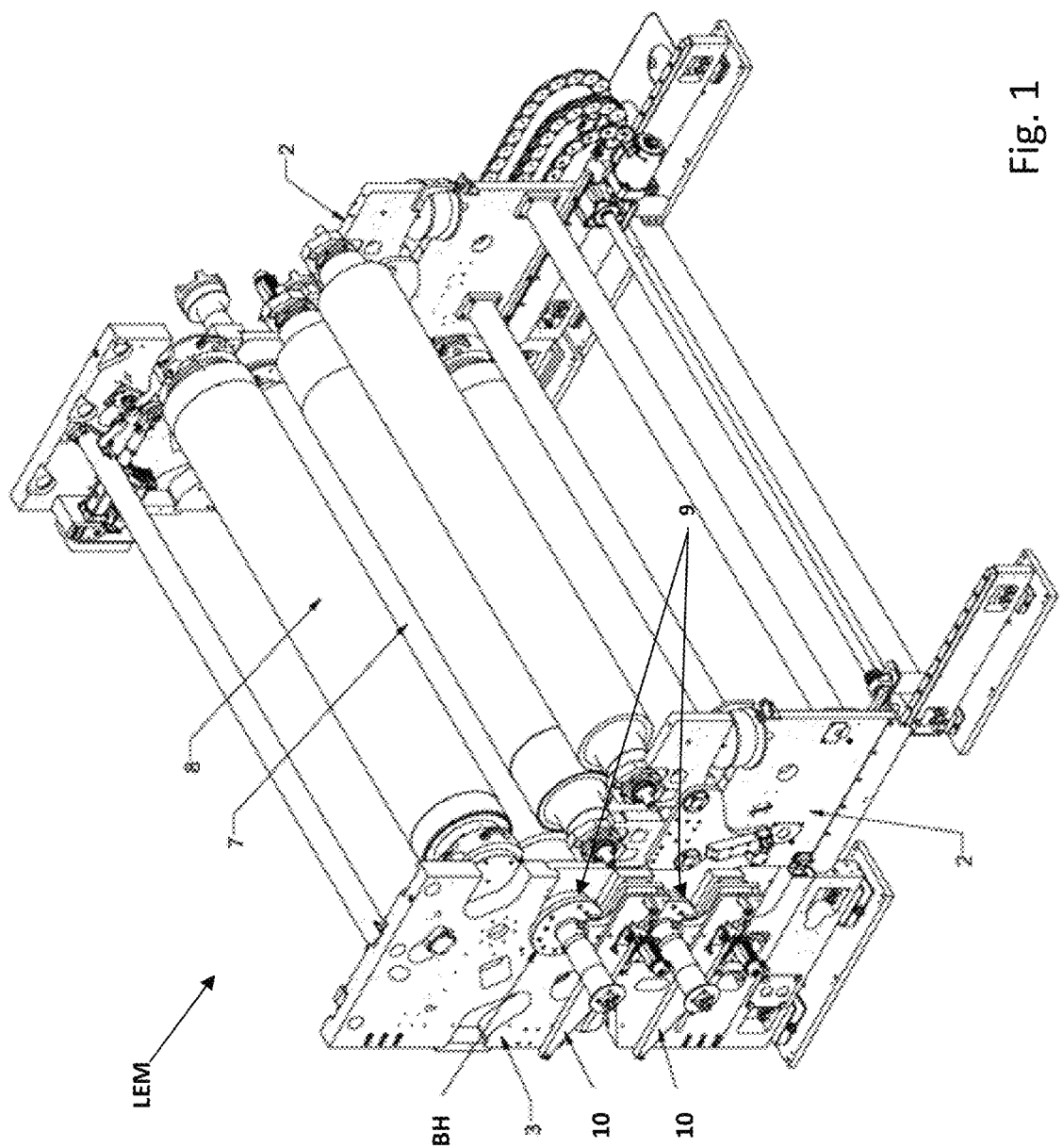
FIG. 1 is a partial, perspective view of an adhesive unit engaged in line with a main frame structure of an embosser/laminator machine.
Figure 2:
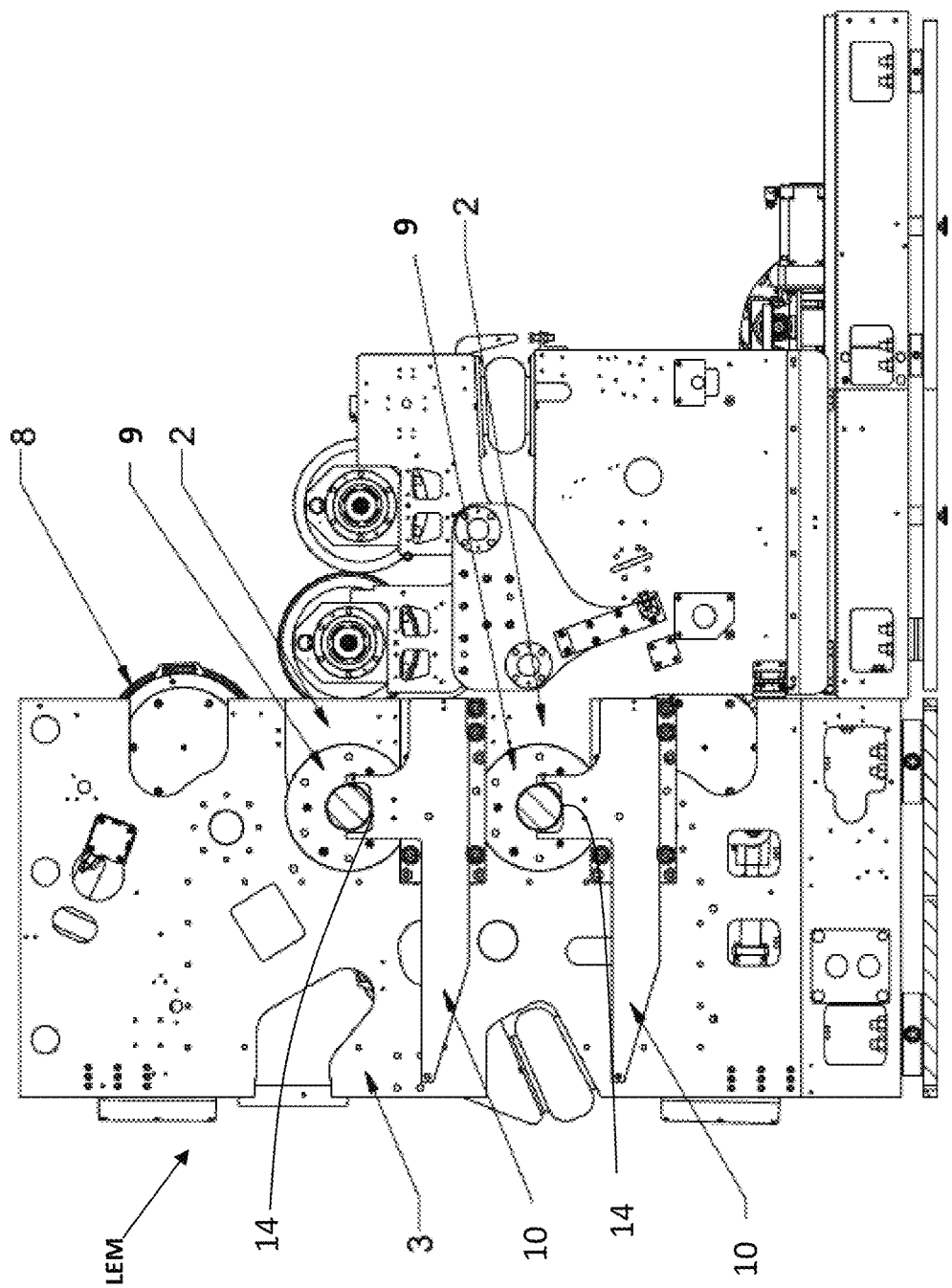
FIG. 2 is a partial side view of the adhesive unit engaged in line with the main frame structure of the embosser/laminator machine.
Figure 3:
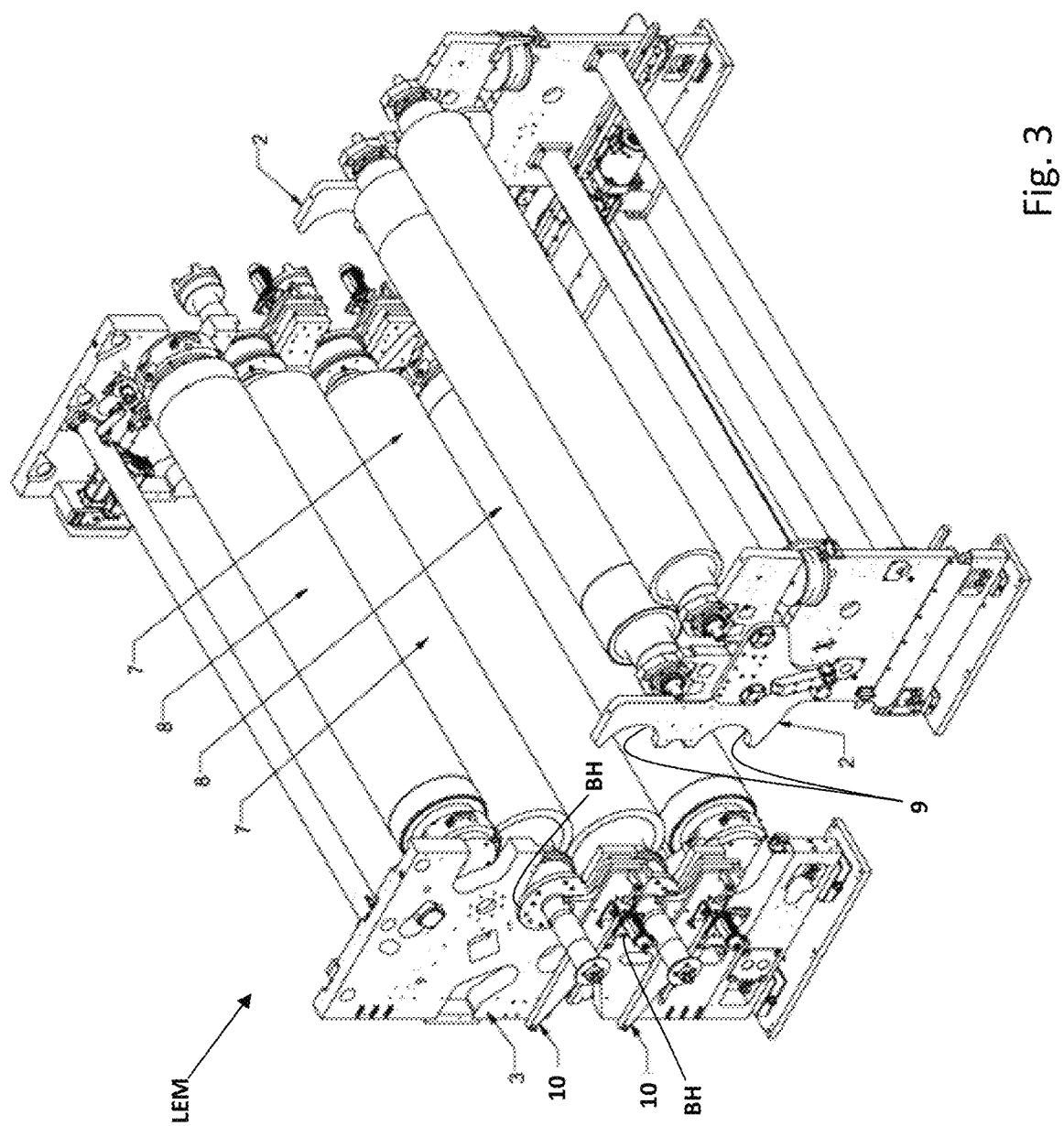
FIG. 3 is a partial, perspective view of the adhesive unit disengaged from the main frame structure of the embosser/laminator machine and showing the bearing caps withdrawn from the rolls of the embosser/laminator machine.
Figure 4:
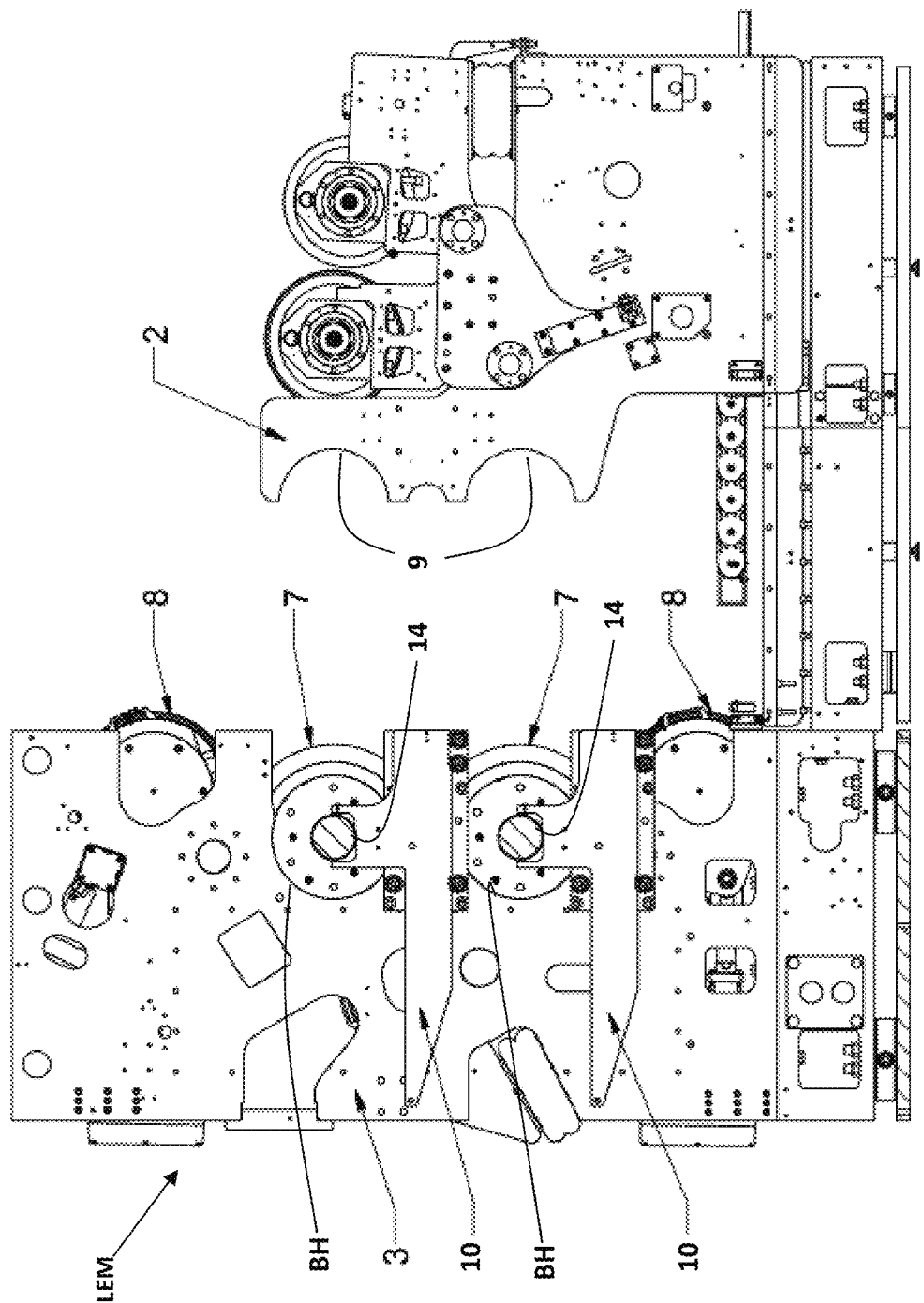
FIG. 4 is a partial side view of the adhesive unit disengaged from the main frame structure of the embosser/laminator machine and showing the bearing caps withdrawn from the rolls of the embosser/laminator machine.
Figure 5:
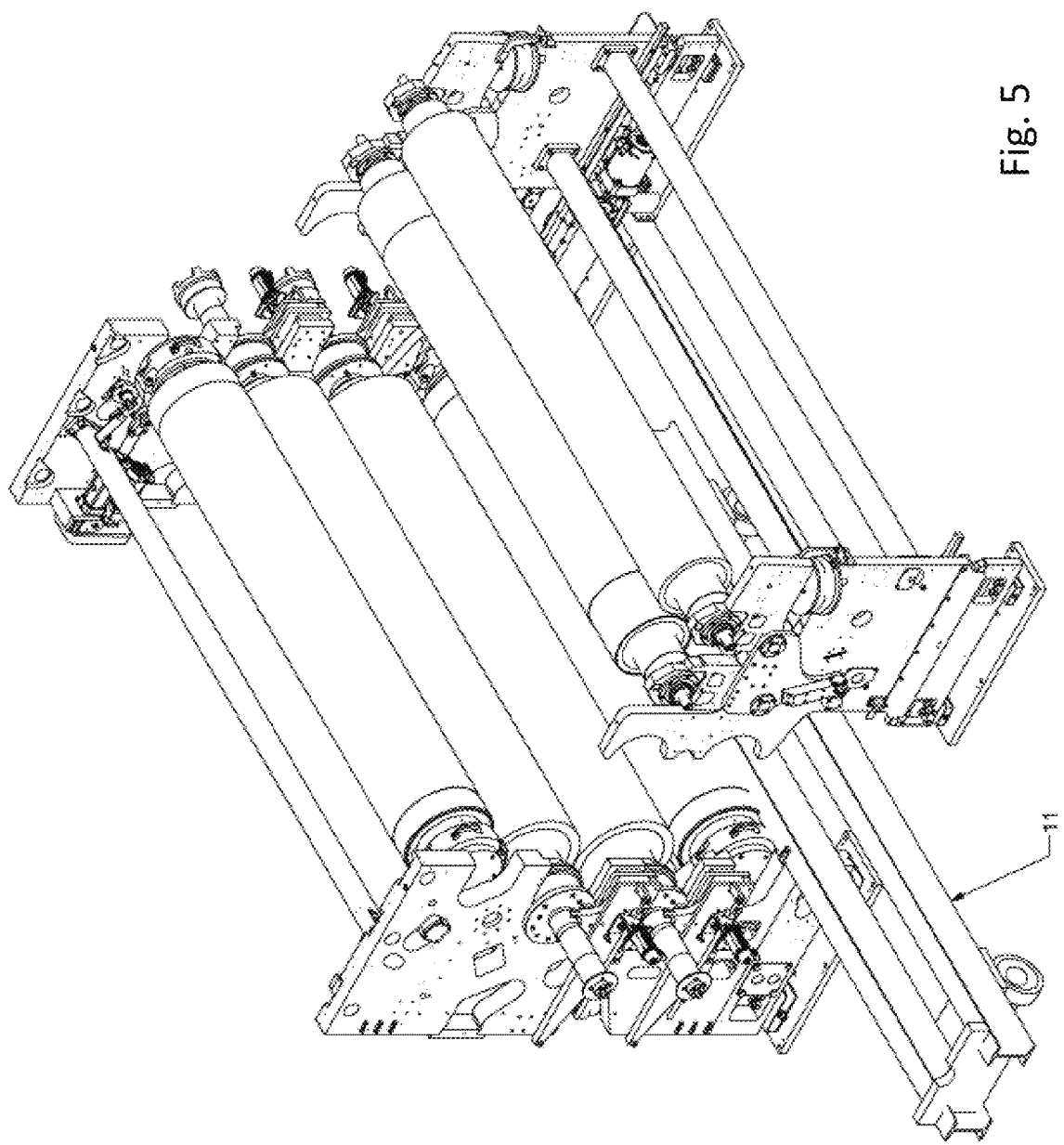
FIG. 5 is a partial, perspective view showing a first embodiment of a cart maneuvered into position in a space between the disengaged adhesive unit and the main frame structure of the embosser/laminator machine.
Figure 6:
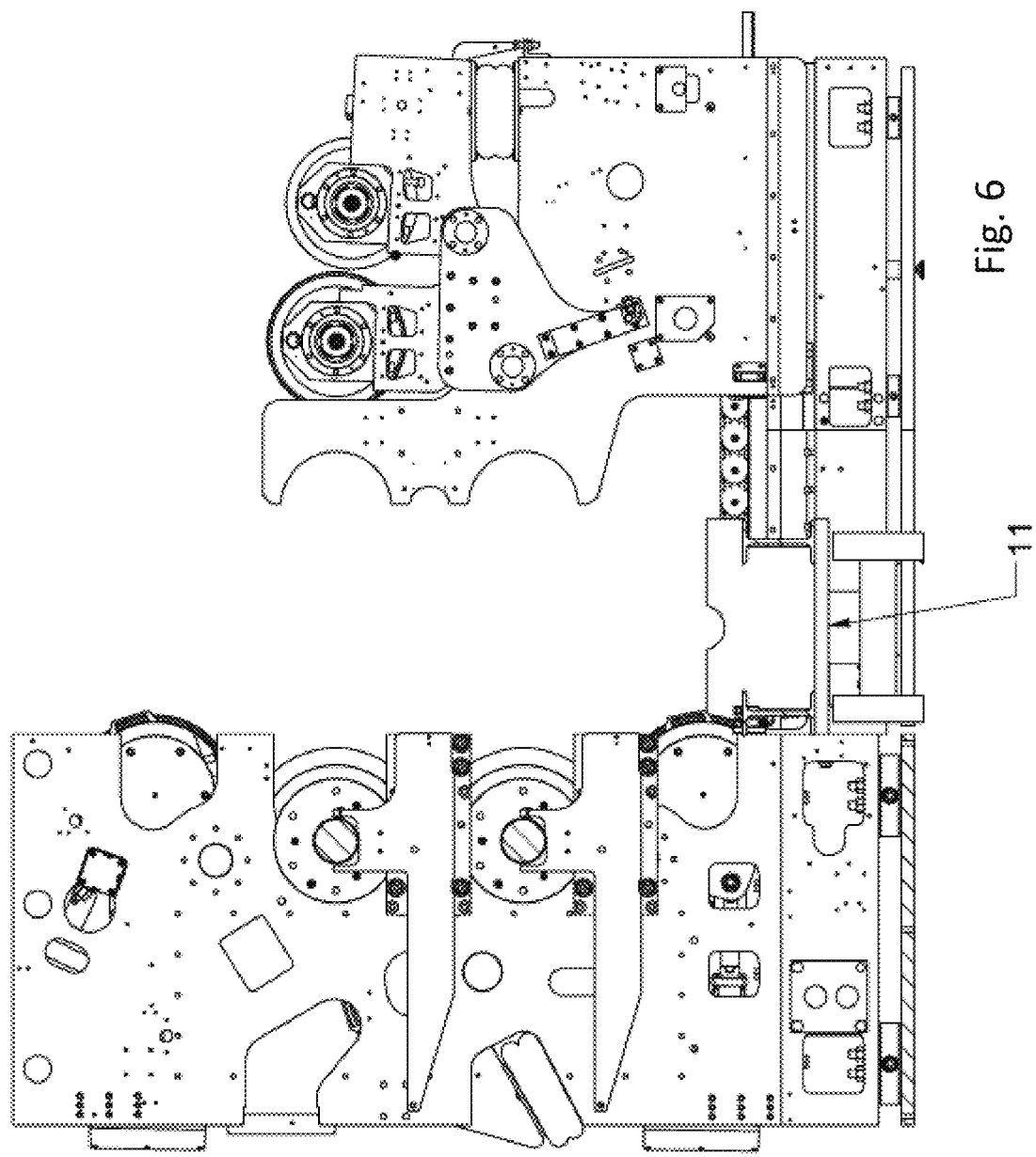
FIG. 6 is a partial side view showing the first embodiment of the cart maneuvered into position in the space between the disengaged adhesive unit and the main frame structure of the embosser/laminator machine.
Figure 7:
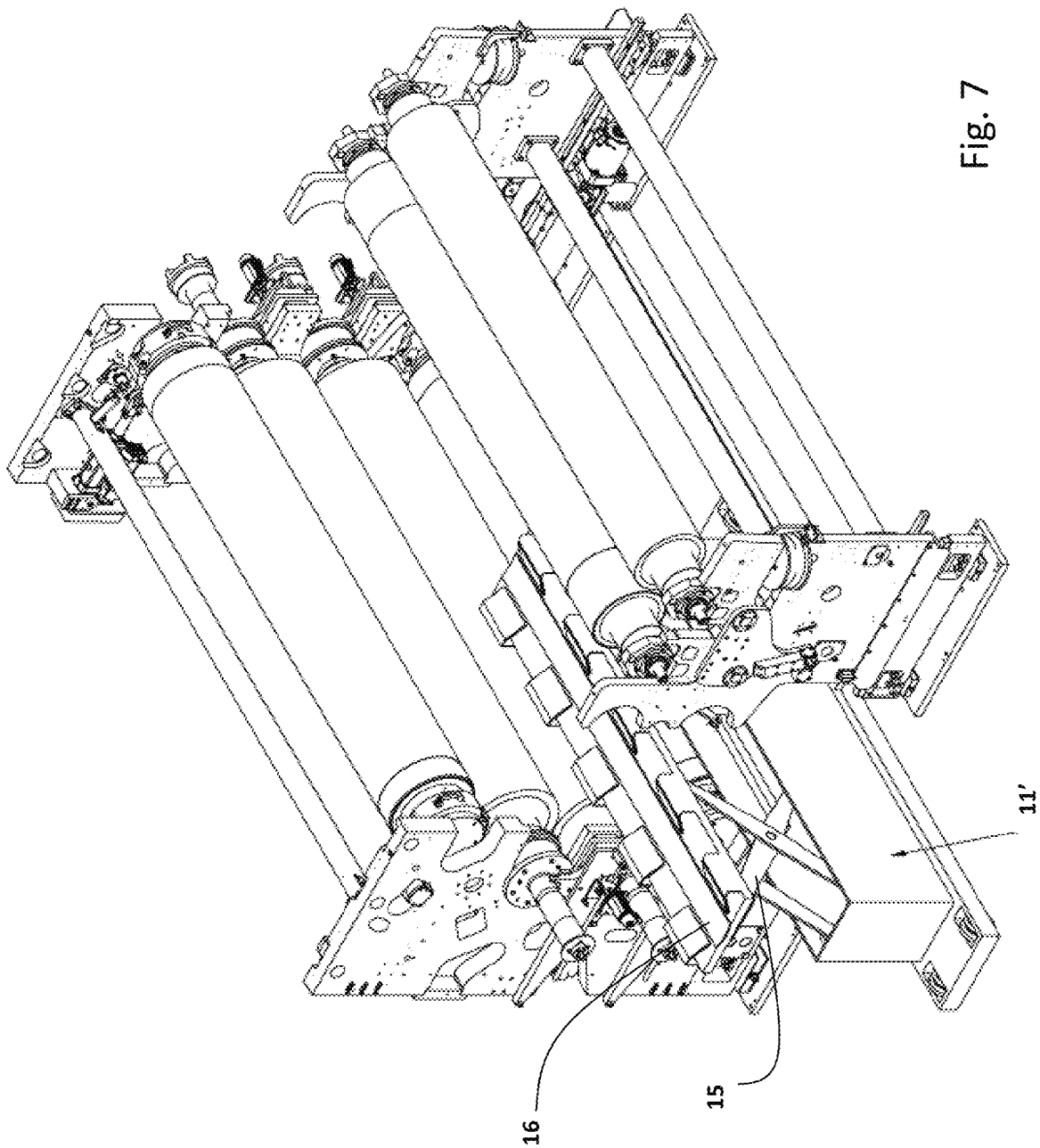
FIG. 7 is a partial, perspective view showing a second embodiment of the cart maneuvered into position in the space between the disengaged adhesive unit and the main frame structure of the embosser/laminator machine.
Figure 8:
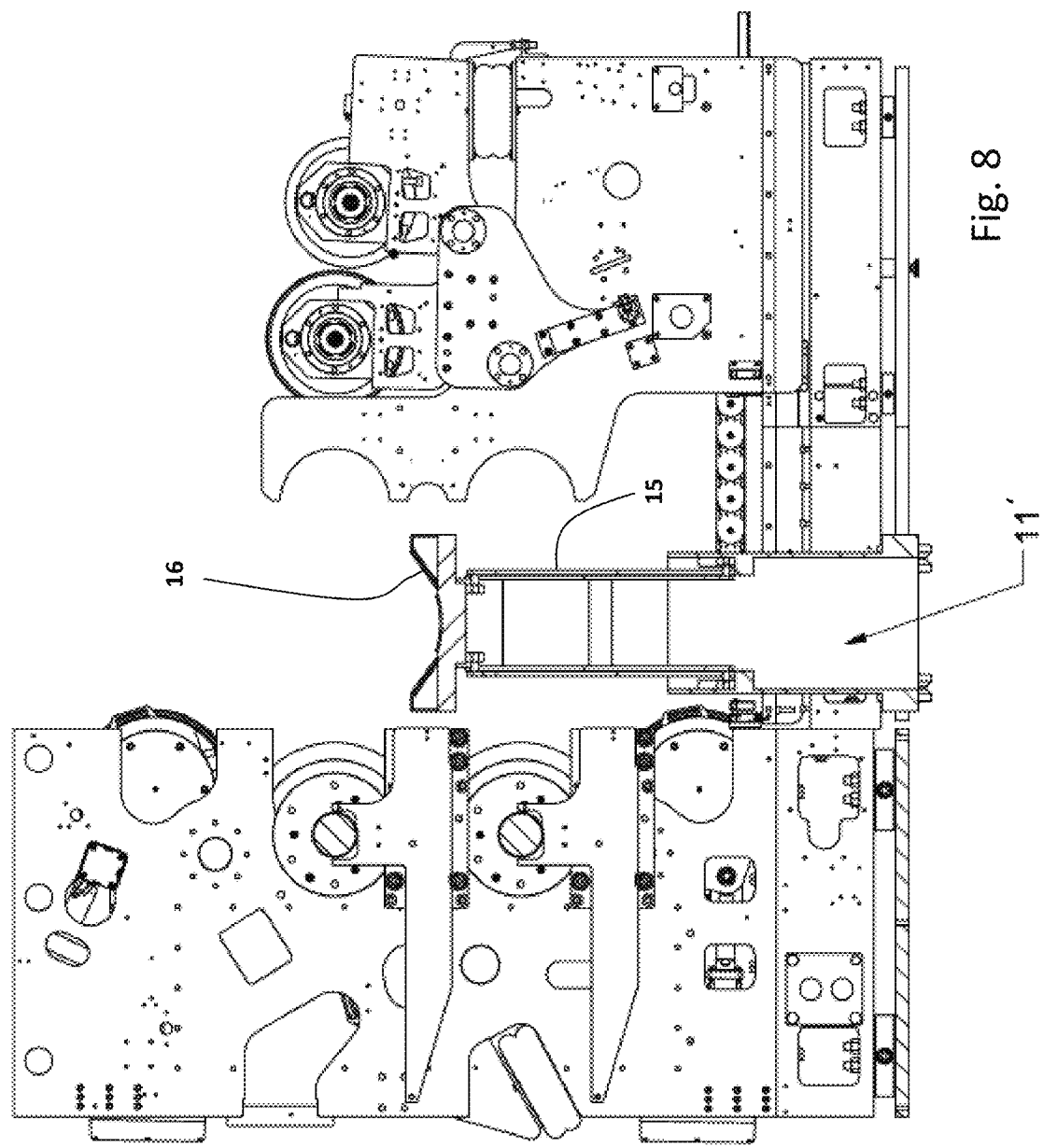
FIG. 8 is a partial side view showing the second embodiment of the cart maneuvered into position in the space between the disengaged adhesive unit and the main frame structure of the embosser/laminator machine.
Figure 9:
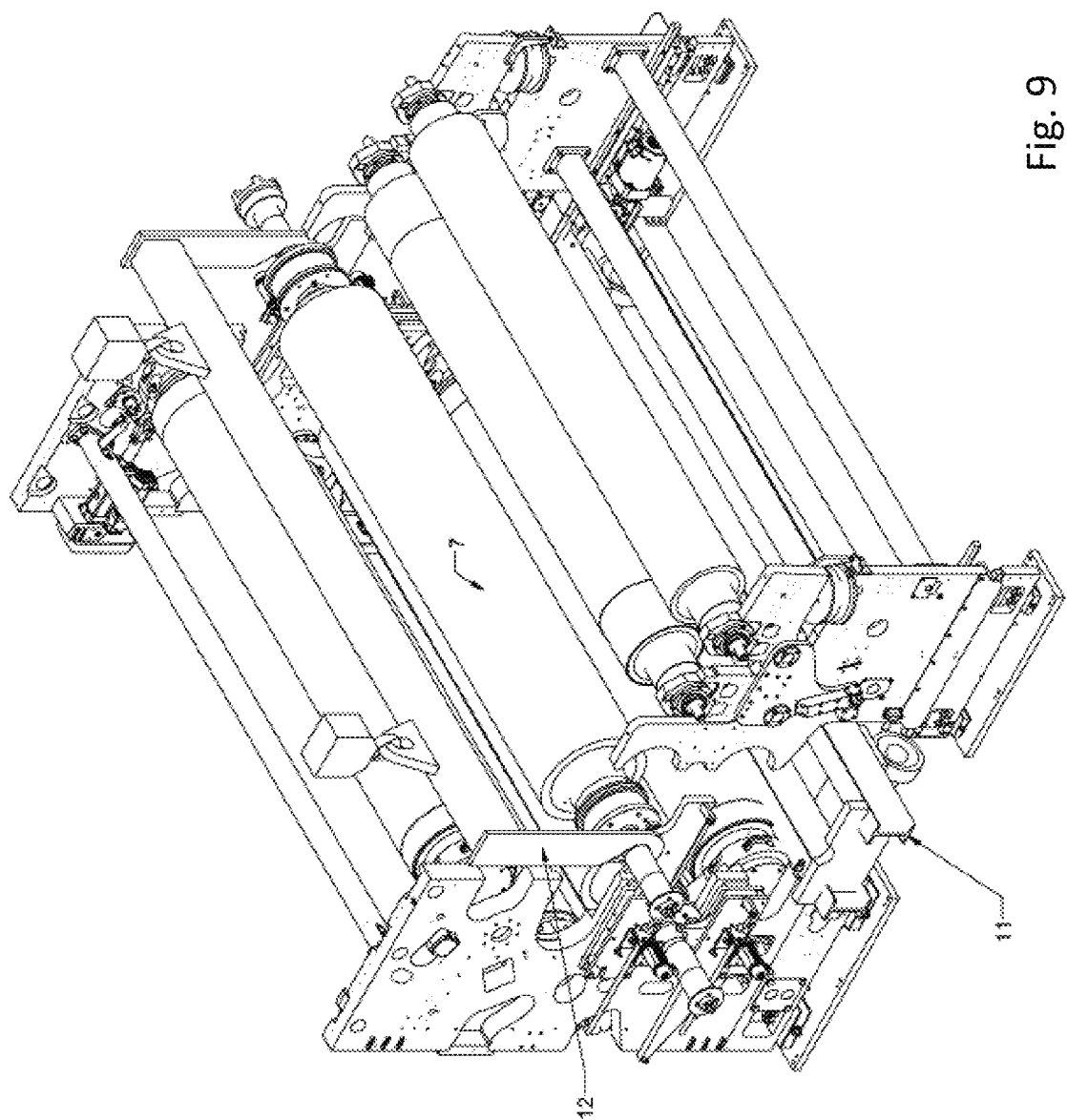
FIG. 9 is a partial, perspective view showing the first embodiment of the cart in register with the main frame structure of the embosser/laminator machine, and the upper roll engaged with an end effector of the extractor driving the upper roll to a position where the roll may be removed from the machine with a crane.
Figure 10:
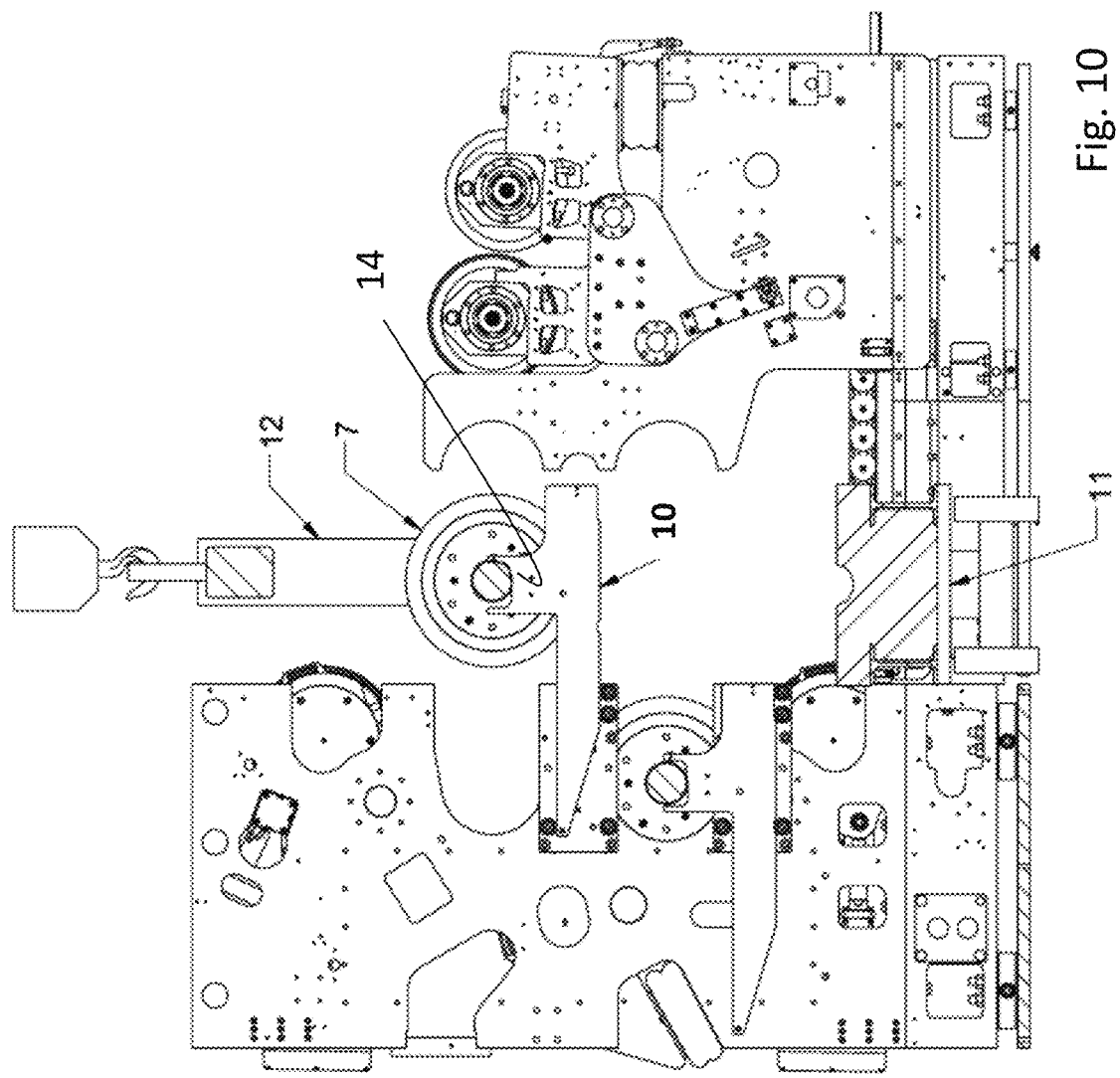
FIG. 10 is a partial, side view showing the first embodiment of the cart in register with the main frame structure of the embosser/laminator machine, and the upper roll engaged with the end effector of the extractor driving the upper roll to a position where the roll may be removed from the machine with a crane.
Figure 11:
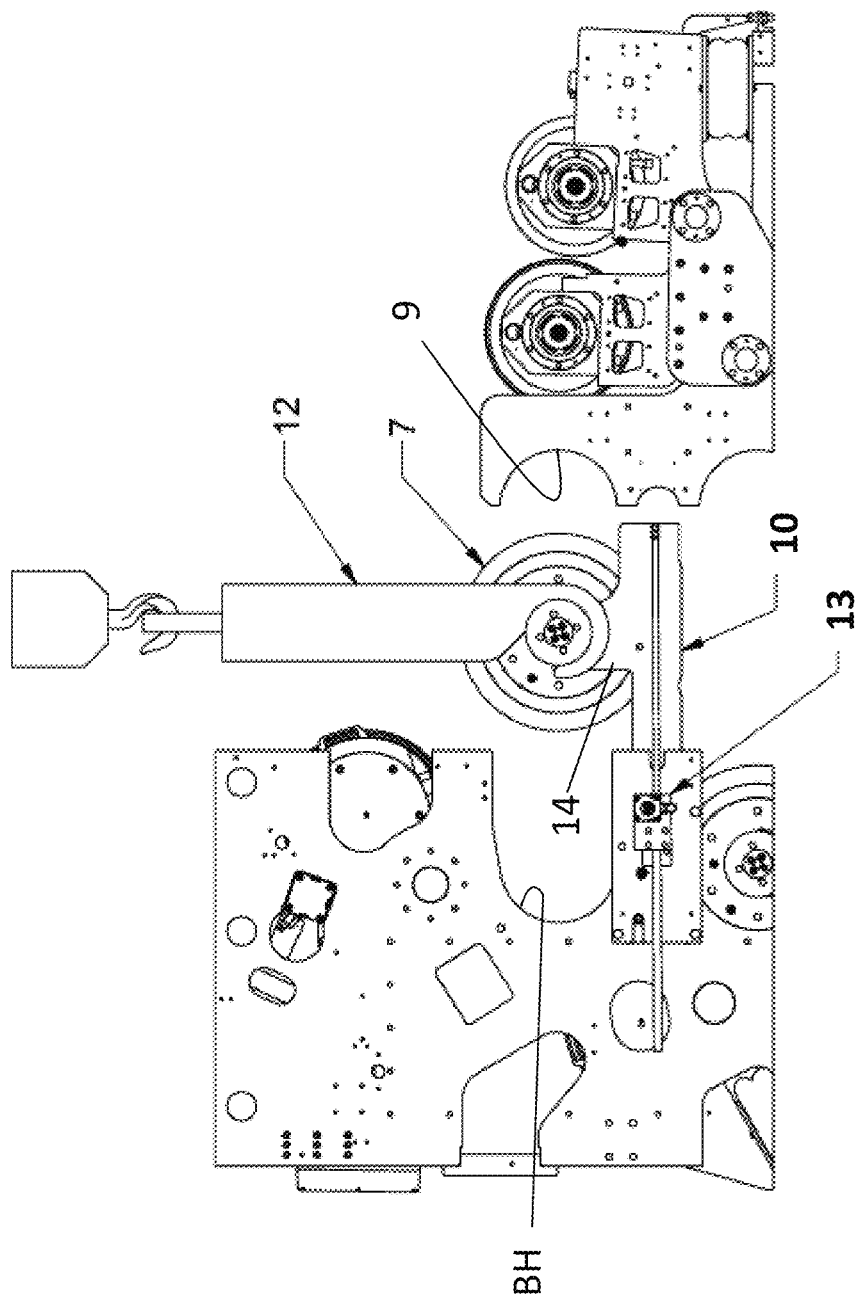
FIG. 11 is a partial side sectional view showing the upper roll engaged with an end effector of the extractor and the crane.
Figure 12:
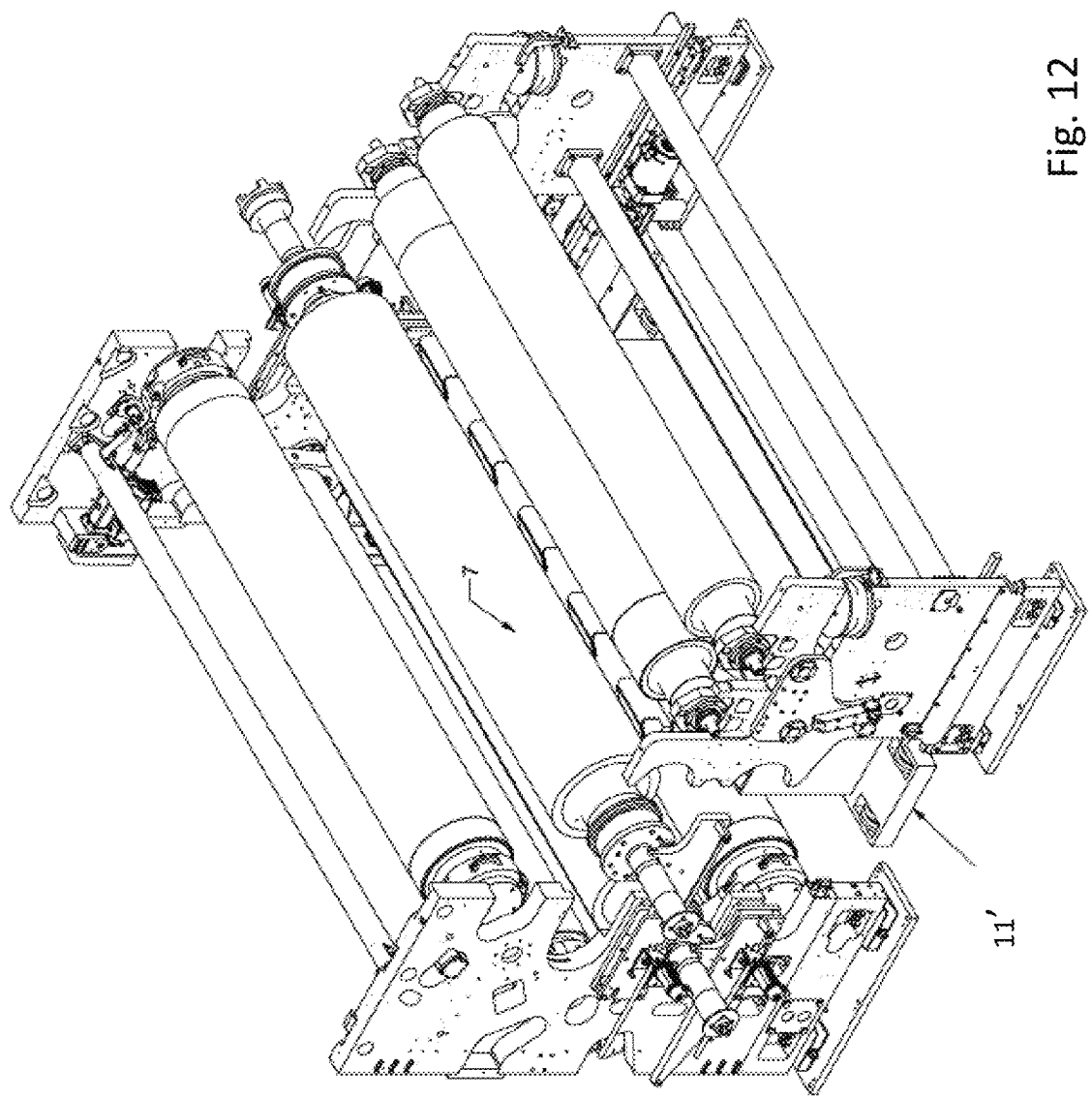
FIG. 12 is a partial, perspective view showing the second embodiment of the cart in register with the main frame structure of the embosser/laminator machine, and the upper roll engaged with the end effector of the extractor driving the upper roll to a position to be received by the second embodiment of the cart.
Figure 13:
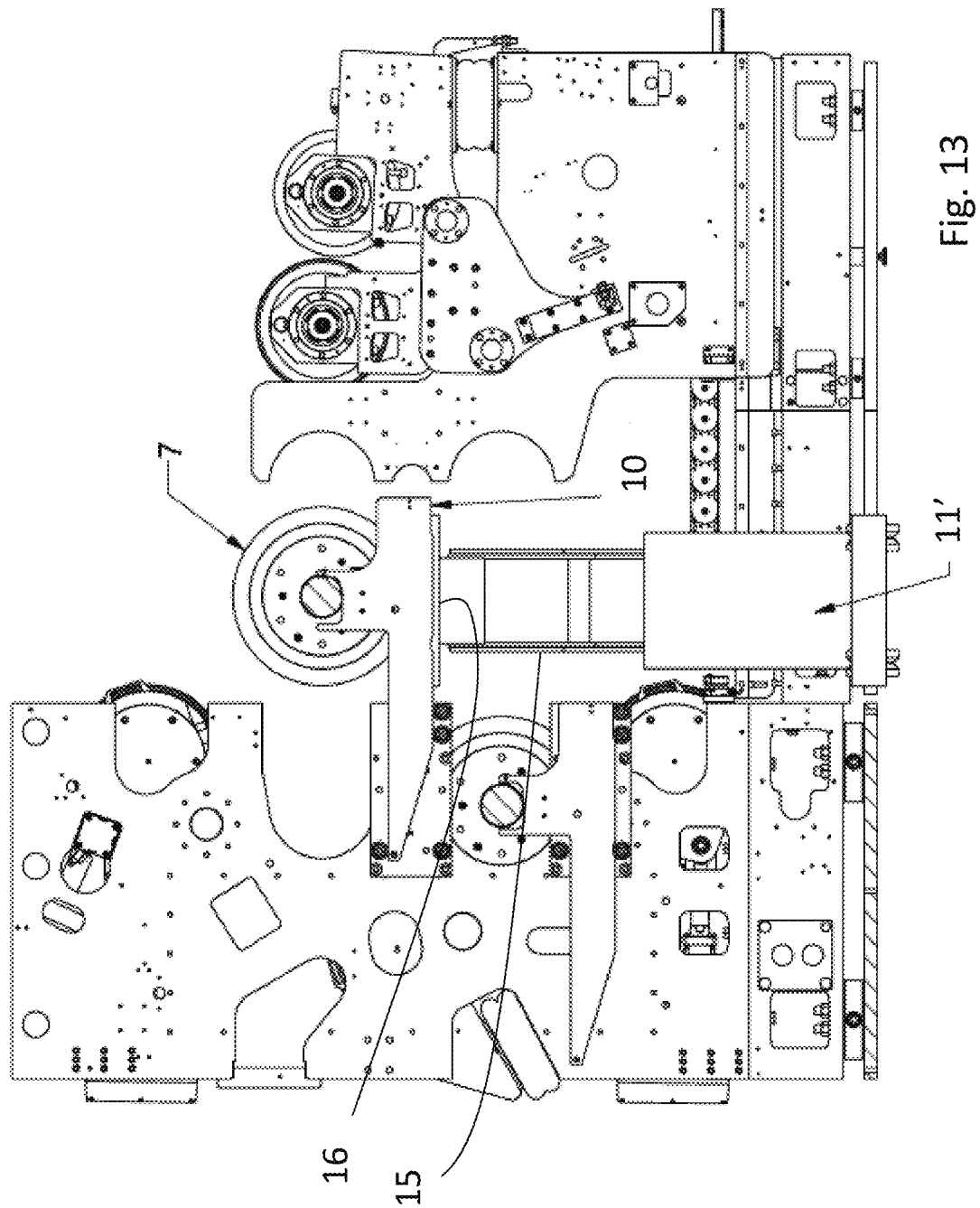
FIG. 13 is a partial, side view showing the second embodiment of the cart in register with the main frame structure of the embosser/laminator machine, and the upper roll engaged with the end effector of the extractor actuator driving the upper roll to a position to be received by the second embodiment of the cart.
Figure 14:
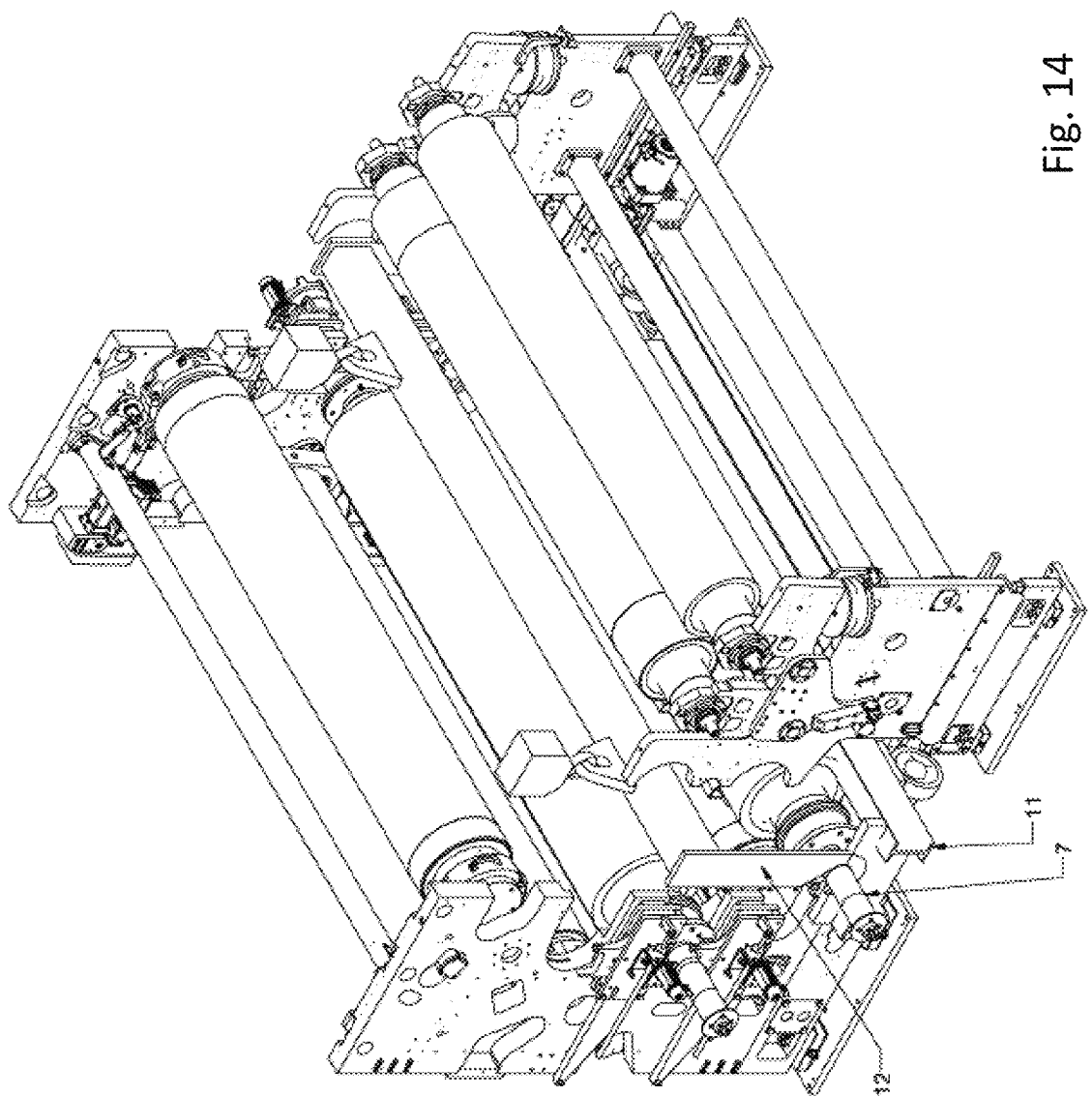
FIG. 14 is a partial, perspective view showing the first embodiment of the cart in register with the main frame structure of the embosser/laminator machine, and the crane lowering the upper roll onto the cart.
Figure 15:
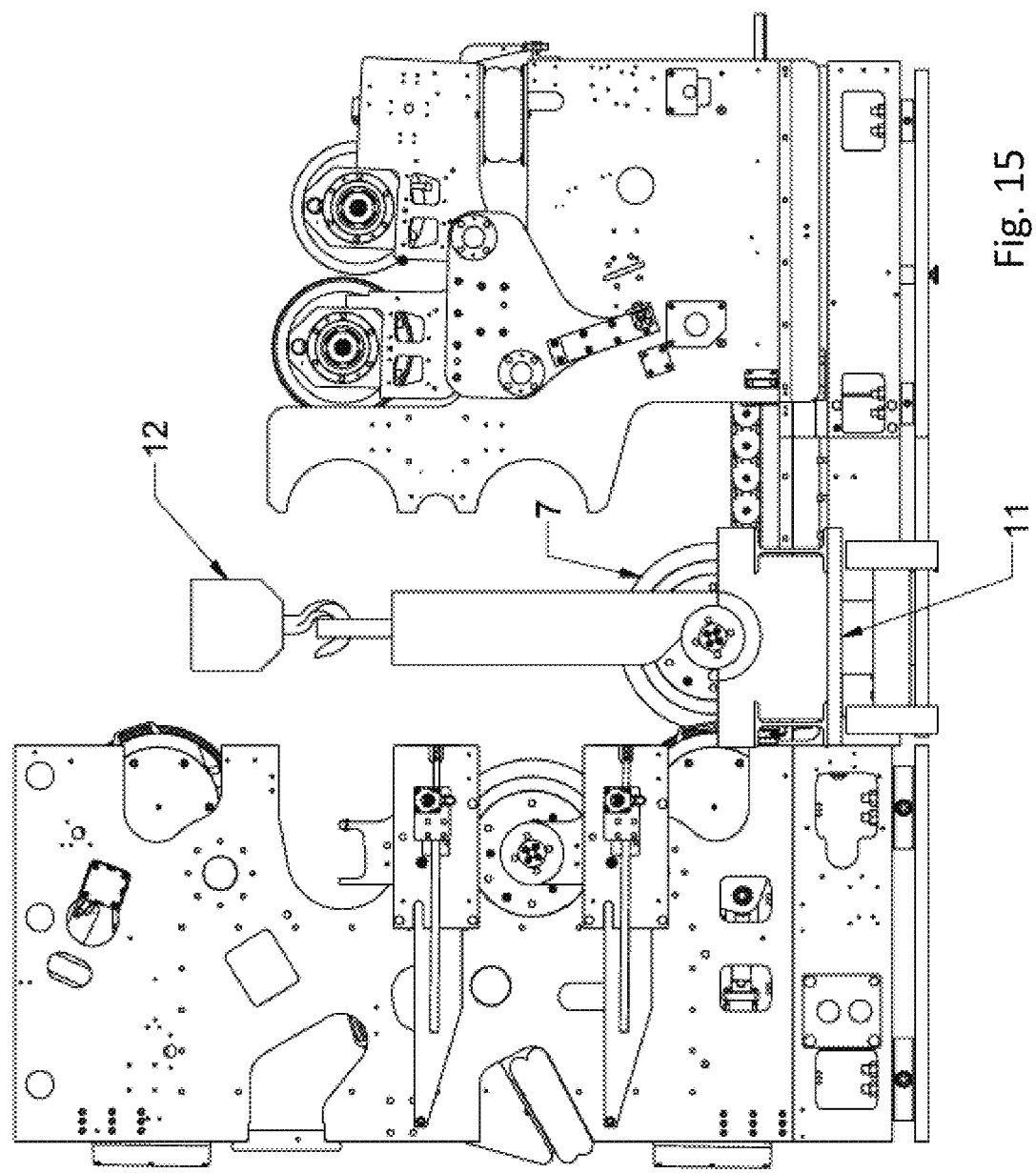
FIG. 15 is a partial, side view showing the first embodiment of the cart in register with the main frame structure of the embosser/laminator machine, and the crane lowering the upper roll onto the cart.

An exemplary laminating/embosser machine LEM may comprise an adhesive unit 2 connectable to a main frame structure 3 of the LEM. The LEM may have an upper and lower roll 7, for instance, a steel embossing roll, and a pressure roll 8, for instance, a rubber embossing roll. The adhesive unit 2 may be comprised of one or more sub-frames that are movable relative to the main frame structure 3 of the LEM in the direction of process flow between engaged and disengaged positions of the adhesive unit relative to the main frame structure. For instance, the adhesive unit 2 and/or its sub-frames may be mounted on rails or slides. The movement between the engaged and disengaged positions of the adhesive unit may be effectuated with actuators known in the art, for instance, a manual operator, or a hydraulic, pneumatic, or electro-mechanical operator. FIGS. 1 and 2 show the adhesive unit 2 connected with the main frame structure 3 of the LEM in the engaged position. FIGS. 3 and 4 show the adhesive unit 2 spaced from with the main frame structure 3 of the LEM in the disengaged position. In the disengaged position, the adhesive unit 2 may be released and moved away from the main frame structure 3 with sufficient space to allow removal of the embossing rolls 7 or maintenance functions. When in the normal operating or engaged position, the adhesive unit is locked into and otherwise physically connected with the main frame structure to secure the embossing rolls 7.

The adhesive deck 2 and the main frame structure 3 of the LEM may each have a portion of bearing housing BH for the rolls of the LEM. The portion of the bearing housing BH associated with the adhesive unit 2 (e.g., the bearing cap 9) and the portion of bearing housing BH associated with the main frame structure 3 may cooperate together to form the bearing housing when the adhesive unit 2 is in the engaged position. When the adhesive unit 2 is in the disengaged position relative to the main frame structure 3, the bearing cap 9 associated with the adhesive unit is spaced from the portion of the bearing housing associated with the main frame structure in a manner to allow the roll 7 to be removed from the main frame as will be explained below. The bearing cap 9 associated with the structure of the sub-frame(s) of the adhesive unit 2 may be monolithically formed in the frame or integrally formed in the frame. In the engaged position, the bearing cap 9 associated with the adhesive unit 2 and the portion of the bearing housing associated with the main frame structure 3 may be locked together to secure the bearings of the embossing roll under the high loads typically found in embossing operations. By way of example, the lock may be an over-center latch that is actuated by an actuator cylinder or motor, and which is configured to remain in its latched position in the event of loss of energy (e.g., loss of air or hydraulic pressure or electrical power). Although the drawings show the bearing cap 9 formed on the adhesive deck and a portion of the bearing housing formed on the main frame structure, the entire bearing housing may be integrated with adhesive deck or the main frame. For instance, a mechanical lock formed on the adhesive deck/main frame may be released when the adhesive deck is moved to the disengaged position thereby releasing the bearing cap from the bearing housing and the roll from the main frame structure.

The rolls 7,8 may be driven with a motor and gear train (not shown). When roll change-over is desired, the drive system of the roll 7 may be disengaged, so that when the adhesive unit 2 is moved to the disengaged position, one or more of the rolls 7 may be exposed in the LEM main frame structure 3, disconnected from the drive, and ready for removal. In one example, the embossing roll 7 may be automatically coupled/uncoupled to a motorization unit. Commercially available couplings, such as R+W model EK6-4500-B-75-120, may be used. The coupling can be engaged and disengaged using an integrated clutch assembly or by displacement of the motorization unit, either of which can be an automated or manual operation. Automatic engagement and disengagement of the motorization unit from the embossing roll improves roll change over and set-up time. Further, such couplings allow for improved alignment of the rolls. For instance, when processing multiple embossed webs with the embossed motifs synchronized, which are processes known to experts in the field, including such processes as registered nested, DESL, point-to-point and others, it is important that the embossed motifs are aligned sufficiently. Traditionally, to start a new production job, the LEM will be briefly put into production while the alignment of the embossed motifs is verified. If the embossed motifs are not properly aligned, an adjustment is made to the change the angular relationship between the steel rolls, and the alignment is again verified until satisfactory. Using a coupling with direct connection between the drive and the roll as described above minimizes the combinations of orientations between the motor and the roll, allowing the machine control system to automatically relate the orientation of the roll during disengagement and engagement of the coupling. If the roll relationship to the motor is known, the verification of embossed motif alignment can be eliminated or simplified. This can be achieved by leveraging a previously known relationship between the motor and roll, knowing the difference of orientation between the motor encoder and roll for all possible coupling engagements, and determining which coupling engagement was made after loading the new roll. This transmission method is also preferred over a conventional belt transmission because better performance can be achieved as a result of a more rigid connection between the motor and the roll. As rigidity of the coupling between motor and roll increases so does controllability of the roll.

The LEM main frame 3 may be provided with an extractor 10 to move each of the rolls between the roll normal operating position in the main frame and an exchange position spaced from the main frame where the roll 7 is accessible for removal by a cart 11 or crane 12. After normal operation of the LEM is stopped for roll change, the extractor 10 is configured to hold the roll 7 in place after the bearing caps 9 are unlocked. The extractor 10 may comprise an actuator 13, for instance, a screw jack actuator provided by Joyce model WJ1000U4S-29-STDX-STDX-X, or a similar type of actuator known in the art capable of moving the roll between the operating position and the exchange position. The extractor 10 may further comprise an end effector 14 that engages the axial ends of the roll. The end effector 14 may have any configuration necessary to engage the roll and secure it in place while the actuator 13 moves the roll between the operating position and the exchange position. The end effector 14 may also have any configuration necessary to hold the roll 7 in position when the adhesive unit is moved to the disengaged position. The end effector 14 may also engage surfaces on the axial ends of the roll used to rotate and drive the roll during normal operations of the machine. The end effector 14 may also engage the operating surface of the roll. The end effector 14 can be advantageously shaped in order to transport the roll with repeatability to the desired pick up position for the crane or cart. The end effector 14 can also be advantageously shaped to work with collars present on the roll journals, so that the roll can always be positioned correctly relatively to its axial direction and main machine frames.

As shown in FIG. 9-13, the extractor 10 projects outward from the main frame structure 3 of the LEM allowing the roll to be positioned sufficiently away from the LEM main frame to allow access by the crane 12 or the cart 11,11'. The roll handling cart 11' may be placed in register with the LEM main frame structure 3 and the roll 7 to change the roll (See FIGS. 7-8 and 12-13). Alternatively, the roll 7 could be placed on the cart 11 using a crane 12 (See FIGS. 5-6, 9-11, and 14-15).

The cart 11,11' allows the roll 7 to be easily made available for use in the LEM, for maintenance or cleaning, or for transportation in, around, and out of a facility. In one embodiment of the cart, the cart 11' may be configured with a lift mechanism 15 providing a deck 16 of the cart with an adjustable height with a range of travel to allow the ability to change rolls in either the upper or lower position on the main frame structure 3 of the LEM, and facilitate manual or automatic maintenance and cleaning of the rolls. The deck 16 of the cart may be raised directly to the exchange position of any embossing roll 7 to receive the roll from the extractor 10 and to be lowered as necessary without an additional device such as a crane. Alternatively, the roll 7 may be placed on a cart using a scissor lift built-into the decking between the main frame structure 3 and the sub-frame 2. The scissor lift may move between a lowered position in which the scissor lift platform is substantially flush with decking between the main frame structure 3 and the sub-frame 2, and a raised position in which the scissor lift platform is in register with the extractor 10 of an associated roll 7. The scissor lift platform may move between the raised and lowered position within an open framework formed internal to the cart, or around the outer periphery or structure of the cart.

The cart 11,11' may have roll fastenings that cooperate with the roll or its bearing housings. As the roll is brought into register with the cart, it can be moved seamlessly into the roll fastenings. The cart roll fastenings may secure the roll onto the cart. To facilitate the seamless transfer, the cart roll fastenings may have a geometry that complements and/or interlocks with the roll, for instance, the axial end drive or bearings of the roll. The cart roll fastenings may also have a geometry that complements and/or interlocks with the extractor to allow a rigid connection between the main frame structure 3, and the cart 11' as the roll 7 is moved between the main frame structure and the cart in case the cart is equipped with an adjustable height deck 16. For instance, rails (not shown) may be placed between the roll fastenings and the main frame structure, and the roll 7 may translate on the rails from the LEM main frame structure to the cart roll fastenings, at which point the roll may be secured to the cart. In one embodiment, the cart roll fastenings may have a geometry similar to the end effector 14 of the extractor 10. In order to transfer the roll from the extractor to the cart roll fastenings, the deck 16 of the cart 11' may be moved (vertically upward in the drawings) a distance to lift the roll using the cart roll fastenings out of the extractor end effector 14. The extractor 10 may then be moved to the operating position so the end effector 14 is clear of the roll. The deck 16 of the cart 11' may then be lowered with roll secured in the cart roll fastenings. Depending upon embodiment, the platform of the scissor lift may be similarly configured with roll fastenings.

When using the crane 12 to remove the roll 7 from the end effector 14, the crane may be moved (vertically upward in the drawings) until the roll clears the end effector, at which point the extractor 10 may be moved to the operating position providing clearance for the crane to move the roll, for instance, to a storage facility or onto the cart 11 as shown in FIGS. 9-11 and 14-15.

The extractor 10 may be a part of an automated process where an operator remote to the LEM operates the extractor 10, crane 12, and/or cart 11 remotely. This decreases operator exposure to the line and equipment. Further, to the extent a cart is not used, the extractor 10 may move the roll 7 away from the LEM main frame structure 3 to a position where a conventional crane 12 can more easily access the roll. The crane 12 could be arranged on-board or integral with the LEM for the specific purpose of changing the rolls or it could be a more general maintenance or a facility general purpose crane.

Making reference to the drawings, one process for removing a roll from the LEM is as follows: (i) the machine stops and the machine operator initiates the roll change sequence; (ii) motorization of the embossing roll is uncoupled automatically; (iii) the bearing caps are unlocked; (iv) the adhesive unit/sub-frame 2 is moved to the disengaged position and the bearing cap on the adhesive unit is spaced away from the portion of the bearing housing on the LEM main frame structure 3 (see FIGS. 3,4); (v) the empty cart 11 enters the space created between the LEM main frame structure 3 and the adhesive unit 2 (see FIGS. 5,6); (vi) the extractor 10 moves the desired roll 7 to the exchange position (see FIGS. 9,10); (vii) the crane 12 lowers the roll 7 to the cart 11 (see FIGS. 11, 14, 15); and (viii) the cart 11 exits the LEM loaded with the roll 7.

Figure 16:
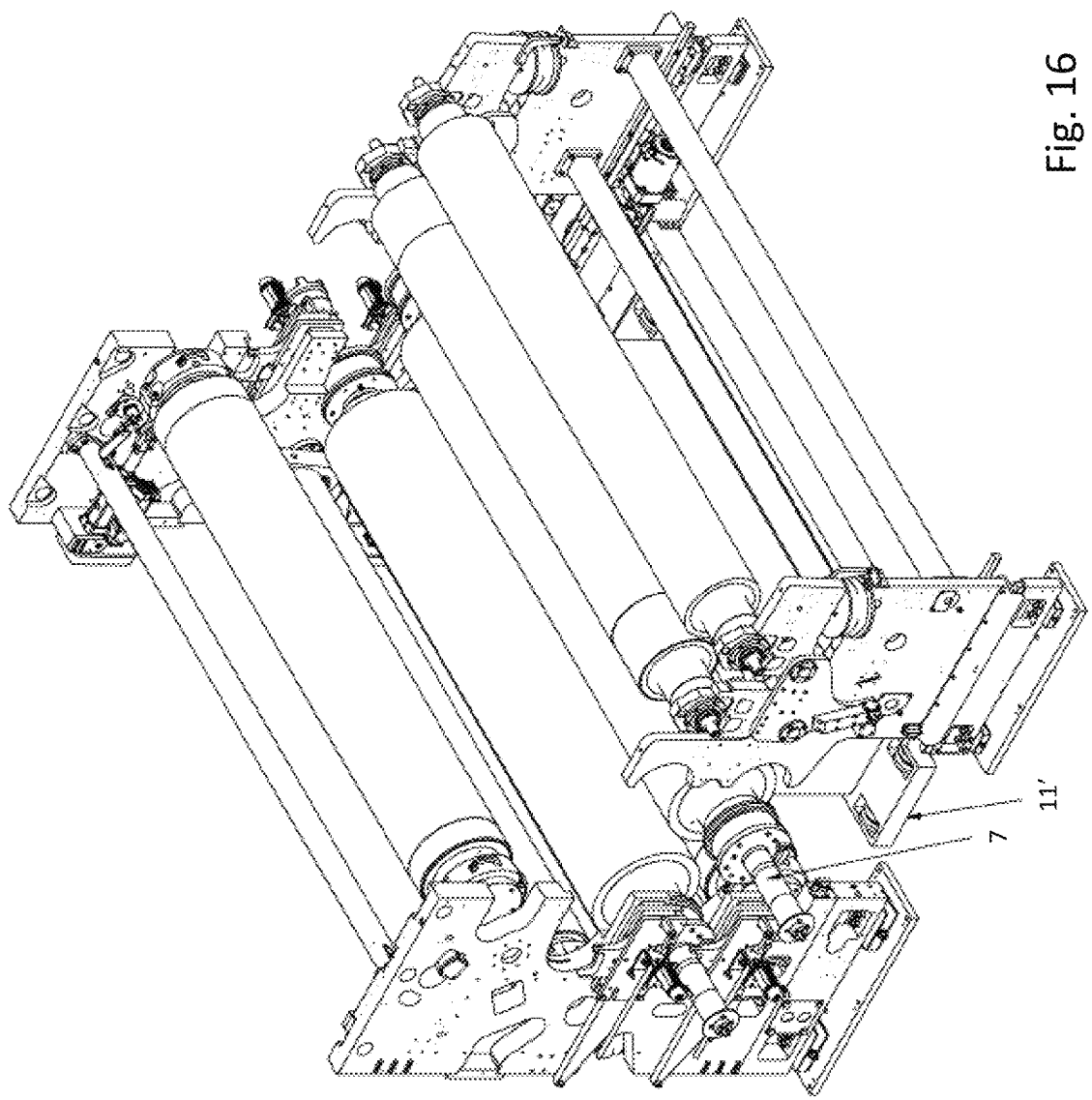
FIG. 16 is a partial, perspective view showing the second embodiment of the cart in register with the main frame structure of the embosser/laminator machine, and a deck of the cart lowering the upper roll to a retracted position of the deck of the cart before removal from the line.
Figure 17:
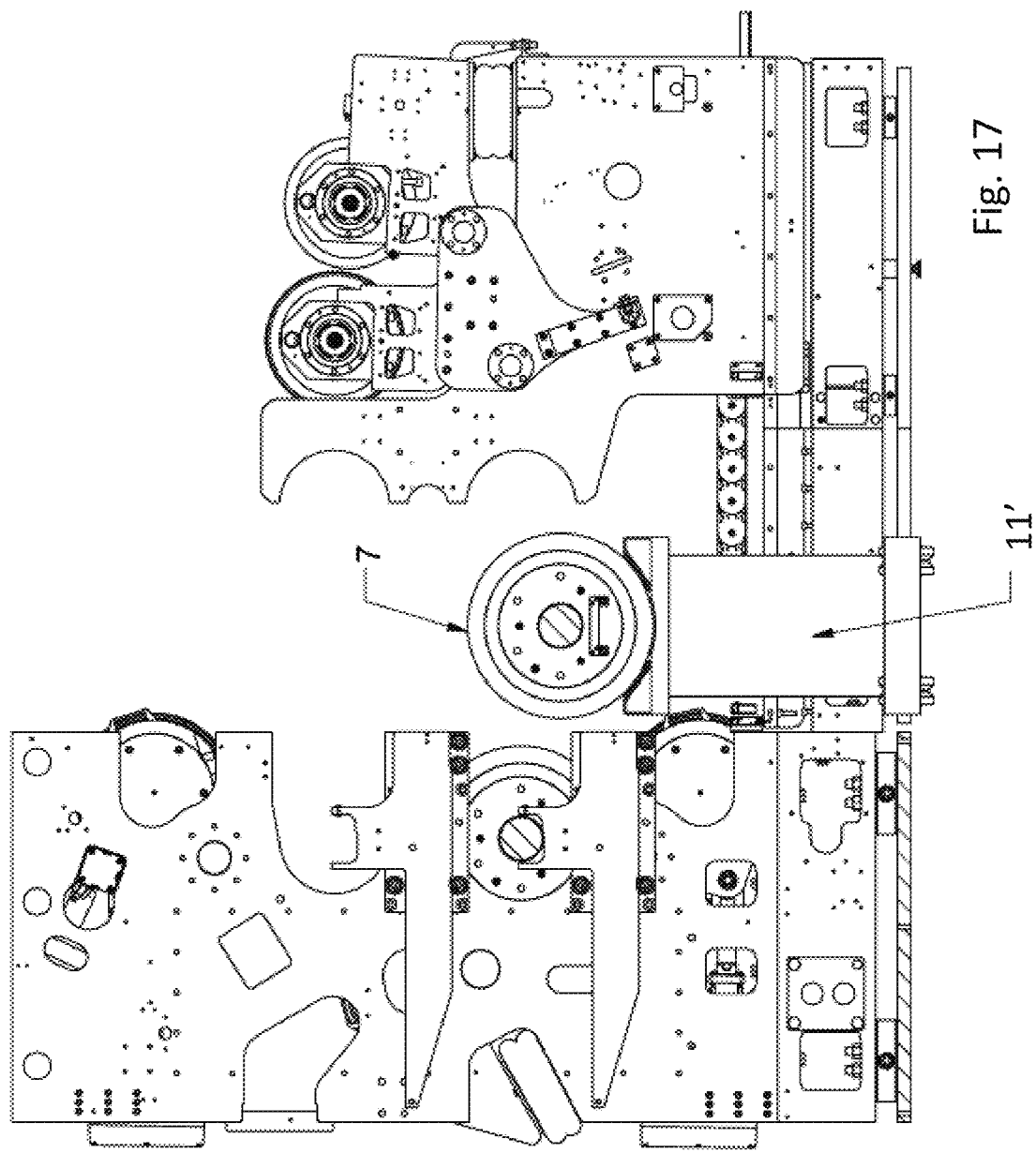
FIG. 17 is a partial, side view showing the second embodiment of the cart in register with the main frame structure of the embosser/laminator machine, and a deck of the cart lowering the upper roll to a retracted position of the deck of the cart before removal from the line.

Making reference to the drawings, another process for removing a roll from the LEM is as follows: (i) the machine stops and the machine operator initiates the roll change sequence; (ii) motorization of the embossing roll is uncoupled automatically; (iii) the bearing caps are unlocked; (iv) the adhesive unit/sub-frame 2 is moved to the disengaged position and the bearing cap on the adhesive unit is spaced away from the portion of the bearing housing on the LEM main frame structure 3 (see FIGS. 3,4); (v) the empty cart 11 enters the space created between the LEM main frame 3 and adhesive unit and a deck 15 of the cart is positioned in register with the extractor (see FIGS. 7,8); (vi) the extractor 10 moves the desired roll 7 to the exchange position (see FIGS. 12,13); (vii) the deck 15 of the cart is lowered with the roll 7 (see FIGS. 16,17); and (viii) the cart 11 exits the LEM loaded with the roll 7.

Following roll removal, the process for installing a roll in the machine is achieved by performing the removal steps in reverse as described below. For instance, a process involving the cart 11 and the crane 12 may be as follows: (i) a roll is introduced to the machine with a second cart; (ii) the crane raises the roll from the cart to the extractor; (iii) the extractor moves the roll into operating position in the LEM main frame structure 3; (iv) the now empty second cart leaves the LEM; (v) the adhesive unit/sub-frame is moved to the engaged position (see FIGS. 1,2); (vi) the bearing caps 9 are locked into the LEM main frame structure 3 to form the bearing housings; (vii) motorization of the embossing roll is recoupled; and (viii) the machine is returned to production.

As another example, a process involving only the cart is as follows: (i) a new roll is introduced with a second cart; (ii) the deck 15 of the cart 11 is raised to bring the roll 7 to the extractor 10; (iii) the extractor moves the roll into operating position in the LEM main frame structure 3; (iv) the now empty second cart leaves the LEM; (v) the adhesive unit/sub-frame is moved to the engaged position (see FIGS. 1,2); (vi) the bearing caps 9 are locked into the LEM main frame structure 3 to form the bearing housings; (vii) motorization of the embossing roll is recoupled; and (viii) the machine is returned to production.

After the roll is lowered to the deck of the cart 11,11', the cart and roll may be moved out of the LEM where it can be cleaned and put into storage. The roll may be stored on or off the cart, for instance, in a roll storage rack. If desired there may be only enough carts to perform the roll changing process. In this case, the rolls are taken off the cart before being put into storage. Others may choose to dedicate a cart to a particular roll, for moving it around their facility, and for storage of the roll. The next time the roll is needed, for instance, for the same machine or machine using an equivalent roll, the roll may be retrieved from the storage rack, placed on the cart and rolled out to the LEM, or if the roll is already stored on a dedicated cart, the roll may be rolled out to the LEM on the cart.

The process of changing between embossed motifs can be further automated by incorporating radio frequency identification (RFID) technology. Each roll may be fitted with an RFID tag. The RFID tag could communicate to the embosser/laminator machine the aforementioned roll alignment information, along with embosser/laminator machine setup adjustment information which otherwise must be entered by a machine operator.

To facilitate changing between embossing motifs within an embosser/laminator or between more than one embosser/laminator, one or more roll storage magazines can be located convenient to the machine(s) that make use of the rolls stored therein. Such roll storage magazines can be fitted with roll extractors and split bearing caps similar to those located within the embosser/laminator, to facilitate transferring rolls between the LEM and the storage magazine.

To facilitate rethreading of the LEM, the LEM may be fitted with a web holder 21 (see FIGS. 18-19) that temporarily holds one or more plies 20 of the web in place until a new roll is installed. Ordinarily, the process of extracting and changing the roll will typically involve severing the ply of web material 20 to be embossed with that roll. If the ply of web material 20 is not held in place once severed, it can be drawn back through the LEM and upstream machines, which increases the rethreading time and therefore the time to return the machine to operation. The web holder 20 may include an actuator 22 that may be moveable between an engaged position and a disengaged position. In the engaged position, the actuator may drive a stop 23 to a position where the stop presses the web 20 against a surface 24 such that the plies 21 of the web are held in place between the stop and the surface. In the disengaged position, the actuator 22 may position the stop 23 at a distance from the surface 24 where the web 20 passes freely therebetween. In one example, as shown in the drawings, the stop 23 may pivot (e.g., counterclockwise) to a position where it presses the web 20 against the surface 24. Alternatively, the stop may move linearly to a position where it presses the web against the surface. The stop and surface may both move toward each other through one or more actuators to the engaged position and away from each other to the disengaged position. The surface may be a structure of the LEM and stationary relative to the sub-frame.

Additionally, to facilitate rethreading of the LEM, the LEM may be fitted with multiple threading members that collectively form points of discontinuity adjacent to nip points in the LEM, thereby eliminating the need to disconnect the threading member before roll change and to reconnect the threading member after roll change. Prior to roll change, the LEM and its associated machines upstream may be adapted and configured to pay out a sufficient length of the ply of web material 20 for an operator to connect with the threading member. The threading member may be a belt, rope, or similar long and flexible member into which the free end of the ply of web material 20 is inserted, and which is then manually or automatically moved through the machine until the ply of web material reaches the last machine in the web converting process. The threading member may be a continuous loop driven by a motor and directed along its path through various points around the LEM with pulleys and guide rollers. Depending upon its location in the LEM, the threading member may be contained with the frame members of the LEM or outside of the frame members of the LEM. In one example, a first inbound threading member 30 may be adapted and configured to draw a ply from a first supply 32 to a position adjacent to the nip point 34 of the top embossing roll 7 and top pressure roll 8 before returning to a position adjacent the first supply, and an exit threading member 36 may be adapted and configured to draw the ply from a point adjacent to the nip point 34 of the embossing roll 7 and pressure roll 8 to a position adjacent downstream machinery 38. The first and second points are arranged in the main frame structure in a manner such that the first and second threading members have sufficient clearance with the roll in the main frame structure of the machine to allow removal and installation of the roll in the main frame structure of the machine without alteration of the first and second threading members, for instance, removing the threading members from the LEM. By routing the first inbound threading member 30 and the exit threading member 36 adjacent to each other and adjacent to the nip point 34 of the embossing roll 7 and pressure roll 8 with sufficient clearance with the embossing roll, the embossing roll may be removed and reinstalled in the LEM without interference from either threading member 30,36. This arrangement eliminates issues with designs using one threading member extending from the nip point and wrapped around the embossing roll, which require the threading member to be disconnected prior to roll change. Because the first inbound threading member 30 and the exit threading member 36 are adjacent to each other and adjacent to the nip point 34 of the embossing roll 7 and pressure roll 8, neither threading member wraps around the embossing roll and thus neither threading member needs to be removed and reinstalled during roll change. Further, during roll exchange when the sub-frame is moved to the disengaged position, the ply of the web may be accessed without interference from the threading member 30,36.

Figure 18:
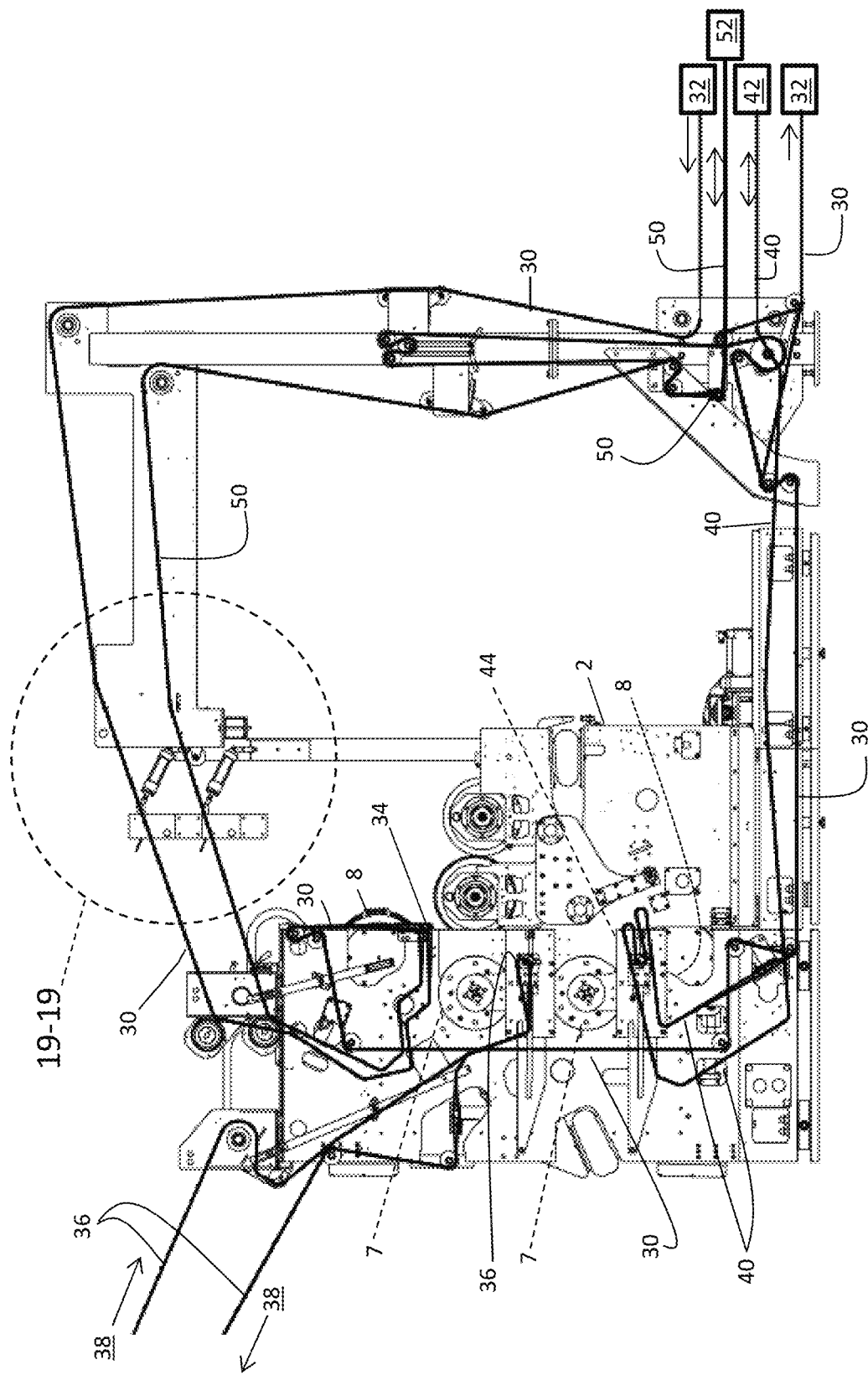
FIG. 18 is a partial side view of the adhesive unit engaged with the embossing/laminating machine and showing paths of threading members used for threading plies of a web through the embosser/lamination machine.
Figure 19:
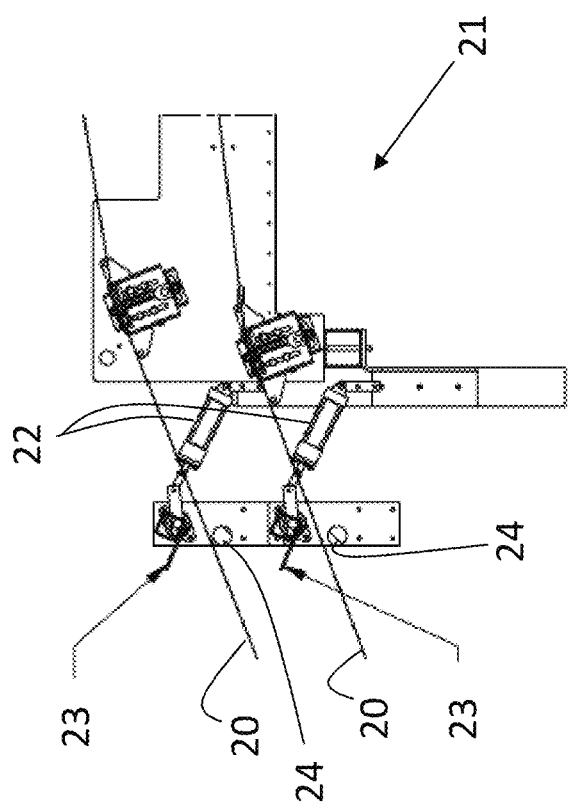
FIG. 19 is an enlarged view of detail area 19-19 of FIG. 18 showing a web holder for temporarily holding the web during stopping of the machine for roll extraction.

By way of example, FIG. 18 shows an example of 4 threading members associated with the LEM. The first inbound threading member 30 may draw the ply from the first supply 32 to the nip point 34 adjacent the top pressure roll 8 and top embossing roll 7. A second inbound threading member 40 may draw a ply from a second supply 42 to a nip point 44 adjacent the bottom pressure roll 8 and bottom embossing roll 7. The third inbound threading member 50 may draw a ply from a third supply 52 to the nip point 34 adjacent the top pressure roll and top embossing roll. The exit threading member 36 may draw a ply from a position adjacent to the nip 34 of the top pressure roll and top embossing roll, a ply from a position adjacent to the nip 44 of the bottom pressure roll and bottom embossing roll, and/or plies from both positions depending upon the configuration of the LEM and the product being processed. With the sub-frame 2 in the disengaged position, the ply from the first inbound threading member 30 and the ply from the second inbound threading member 40 may be accessed at the nip point 34 of both the top pressure roll and top embossing roll and the nip point 44 of the bottom pressure roll and bottom embossing roll, and connected with the exit threading member 36 to be directed to downstream machinery 38. In a like manner, depending upon the product and machine configuration, the ply from the third inbound threading member 50 may be accessed at the nip 34 of the top pressure roll and top embossing roll and connected with the exit threading member 36 to be directed to downstream machinery 38. Again, depending upon the product and machine configuration, the ply from the third inbound threading member 50 may be accessed at the nip 34 of the top pressure roll and top embossing roll, and the ply from the second inbound threading member may be accessed at the nip 44 of the bottom pressure roll and bottom embossing roll, and connected with the exit threading member 36 to be directed to downstream machinery 38. Other combinations of gathering the plies at one or both of the nips may also be achieved depending upon the configuration of the LEM and the product being processed. With the sub-frame moved to the disengaged position during top and/or bottom embossing roll exchange, the ply of the web may be accessed without interference from the threading member 30,36,40,50, thereby simplifying roll exchange and threading procedures.

As is apparent from the foregoing description and drawings, the rolls 7,8 may be arranged in the LEM in a manner that is beneficial to the embossing/laminating process, but also advantageous to roll removal. For instance, the rolls may be positioned in the LEM in a manner such that any deflection resulting from the various nip loads applied to the roll and load from the weight of the roll is minimized. The rolls can be positioned in the LEM such that the web enters the embossing nip at a position tangent or nearly tangent to the nip with no wrap or minimal wrap angle around the roll. The rolls can be positioned in the LEM such that the free span of one web of material prior to joining with the other web of material is minimized. Additionally, the rolls can be positioned in the LEM such that the length of the joined plies of the web material prior to the final setting of the lamination with pressure, adhesive, or other means is minimized.

The LEM as described herein may be modified with certain manual functions. For example, the LEM may include bearing caps that are separate members which are not integrally formed with the sub-frame of the adhesive unit 2. In one example, the sub-frames of the adhesive unit 2 may be moved longitudinally away from the main frame structure 3 of the LEM to create space for the roll exchange. An operator may then manually remove the bearing caps from the main frame structure 3 and/or the adhesive 2 unit to allow transfer of the roll to the cart. The pressure or rubber roll 8 may have a system of bearing caps that may be opened, for instance, in a manner similar to the embossing roll 7. An extractor of the type previously described for the embossing roll may be provided adjacent to the pressure roll 8 allowing the pressure roll to be moved into and out of the LEM in a manner similar to that of embossing roll, including through use of the cart 11,11', crane 12 and or deck mounted scissor lift. In addition, other rolls associated with LEM (e.g., a marrying roll, applicator roll or gravure roll) may each have an extractor allowing the roll to be moved into and out of the LEM in a manner similar to that of embossing roll, including through use of the cart 11,11', crane 12 and or deck mounted scissor lift. Additionally, instead of the actuator 13, the extractor 10 may be equipped with a hand wheel or lever that an operator may use to manually move the roll to the exchange position. Rather than an on-board automated crane and/or cart with an adjustable height deck, a general purpose facility maintenance crane can remove the roll from the machine. The extractor, adhesive unit bearing caps, and/or cart, as described herein, may be retrofitted to an existing embosser/laminator machine to increase the operational flexibility of the machine.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed, unless such an order is inherent.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A method comprising:
   accessing a machine for processing a web of material wherein the machine has a main frame structure, a sub-frame releasably connectable with the main frame structure, and an extractor operatively connected with the main frame structure adapted and configured to move a roll of the machine between the main frame structure and an exchange position between the main frame structure and the sub-frame when the sub-frame is released from the main frame structure;
   disconnecting the sub-frame from main frame structure;
   moving the sub-frame from the main frame structure; and
   moving the extractor to the exchange position between the moved away sub-frame and the main frame structure.

2. The method of claim 1 wherein the step of moving the extractor to the exchange position includes moving the roll of the machine from the main frame structure to the exchange position.

3. The method of claim 2, further comprising removing the roll from the extractor with a crane with the extractor in the exchange position.

4. The method of claim 3 wherein the step of removing the roll from the extractor with the crane with the extractor in the exchange position comprises using a crane operatively mounted on the machine.

5. The method of claim 4, wherein the step of placing the roll on the cart comprises elevating a deck to a position to engage the roll from the extractor with the extractor in the exchange position.

6. The method of claim 3, wherein the step of removing the roll from the extractor with the crane with the extractor in the exchange position comprises using the crane to transport the roll to a storage location.

7. The method of claim 5 further comprising using the cart to transport the roll to a storage location.

8. The method of claim 5, wherein the step of placing the roll on the cart comprises elevating a deck to a position to engage the roll from the extractor with the extractor in the exchange position.

9. The method of claim 1 further comprising: (i) placing a roll on the extractor after performing the step of moving the extractor to the exchange position, (ii) moving the roll from the exchange position to the main frame structure; (iii) moving the sub-frame toward the main frame structure; (iv) connecting the sub-frame with main frame structure; and (v) operatively securing the roll to the machine between the sub-frame and the main frame structure.

10. The method of claim 9, further comprising placing the roll on the extractor with a crane with the extractor in the exchange position.

11. The method of claim 9, further comprising placing the roll on a cart, and arranging the cart between the spaced apart sub-frame and the main frame structure.

12. The method of claim 11, further comprising elevating a deck to a position to engage the roll with the extractor in the exchange position.

13. The method of claim 1 further comprising holding a position of web relative to the main frame structure prior to disconnecting the sub-frame from main frame structure.

14. A method comprising:
accessing a machine for processing a web of material wherein the machine has a main frame structure and an extractor operatively connected with the main frame structure, the extractor is adapted and configured to reciprocate in a horizontal direction into and out of the main frame structure;
moving the extractor horizontally out of the main frame structure to an exchange position spaced from the main frame structure; and
performing one of (i) receiving a roll onto the extractor for installation in the machine, and (ii) moving a roll of the machine from the main frame structure to the exchange position for removal of the roll from machine;
wherein the machine further comprises a sub-frame configured and adapted to be moveable relative to the main frame structure; and the method further comprises:
disconnecting the sub-frame from the main frame structure; and
moving the sub-frame away from the main frame structure before the step of moving the extractor to the exchange position.

15. The method of claim 14 further comprising moving a roll of the machine from the main frame structure to an exchange position between the main frame structure and the sub-frame.

16. The method of claim 15 wherein the step of disconnecting the sub-frame from main frame structure includes releasing the roll from a bearing housing formed by a portion of the main frame structure and a portion of the sub-frame.

17. The method of claim 14 further comprising receiving a roll of the machine on the extractor with the extractor in an exchange position between the main frame structure and the sub-frame.

18. The method of claim 17 further comprising moving the extractor from the exchange position to a normal operating position within the machine and securing the roll to the machine between the sub-frame and the main frame structure.

19. The method of claim 18 wherein the step of securing the roll to the machine between the sub-frame and the main frame structure includes installing the roll in a bearing housing formed by a portion of the main frame structure and a portion of the sub-frame.

* * * * *